United States Patent [19]

Letemps et al.

[11] Patent Number: 4,773,926
[45] Date of Patent: Sep. 27, 1988

[54] TEMPERING OF GLASS

[75] Inventors: Bernard Letemps; Daniel Colmon, both of Thourotte, France

[73] Assignee: Saint-Gobain Vitrage, Courbevoie, France

[21] Appl. No.: 890,985

[22] Filed: Jul. 30, 1986

Related U.S. Application Data

[63] Continuation of Ser. No. 620,170, Jun. 13, 1984, abandoned.

[30] Foreign Application Priority Data

Jun. 14, 1983 [FR] France .................................. 83 09841

[51] Int. Cl.⁴ ............................................. C03B 27/00
[52] U.S. Cl. ........................................ 65/114; 65/104; 65/348; 65/351
[58] Field of Search ................... 65/114, 348, 351, 104

[56] References Cited

U.S. PATENT DOCUMENTS

| | | | |
|---|---|---|---|
| 4,028,086 | 6/1977 | Rahrig et al. | 65/351 |
| 4,204,845 | 5/1980 | Shields et al. | 55/114 X |
| 4,222,764 | 9/1980 | Revells et al. | 65/348 |

Primary Examiner—Arthur Kellogg
Attorney, Agent, or Firm—Pennie & Edmonds

[57] ABSTRACT

The invention relates to air tempering of glass in flat tempering installations. It proposes blowing air, particularly at sonic speed, with nozzles, preferably tubular, slightly distant from the glass, exhibiting the maximum loss of pressure at their free end close to the glass. It makes possible the tempering, under economically advantageous conditions, of glass sheets having thicknesses less than 2 mm and all the more so, glass sheets having greater thicknesses, which can be used as glasses, particularly windshields, for motor vehicles.

16 Claims, 3 Drawing Sheets

TEMPERING OF GLASS

CROSS REFERENCE TO RELATED APPLICATION

The application is a continuation of application Ser. No. 620,170, filed June 13, 1984 now abandoned.

TECHNICAL FIELD

The invention relates to air tempering of glass sheets while each glass sheets moves in a horizontal attitude through a tempering instrumentality. The sheets of glass which undergo tempering may be thin. For example, the sheets of glass may have a thickness on the order of about 2 mm or less.

BACKGROUND OF THE INVENTION

Sheets of glass having a thickness of not less than about 3 mm are tempered successfully according to present day regulations and practices, thereby to find use in automotive manufacture. One typical regulation is Reg. No. 43 of an agreement of the United Nations. This regulation calls for uniform conditions of approval, as well as a mutual recognition of approval of motor vehicle equipment and parts.

Typically, these regulations include a requirement that each sheet of glass, or more particularly the resultant fragments from an impacted sheet of glass, pass certain criteria. Thus, after an impact of a force sufficient to break the sheet of glass, the number of glass fragments within an area of 25 cm$^2$ (5 cm×5 cm) at a distance greater than 7.5 cm from the point of impact should be between 40 and 350. No glass fragment, except possibly the glass fragments within the radius of 7.5 cm measured from the point of impact, should exceed 3 cm$^2$ in surface area, and the glass fragments of elongated shape which may exist should not exceed 7.5 cm in length. Sheets of glass at high temperature, of a thickness not less than 3 mm and moving in a horizontal attitude, have been tempered to meet these conditions by a flow of air impinging on the sheet of glass at a speed on the order of about 200 m/s, with a flow blown on the sheet of glass that can approach 1200 Nm$^3$/m$^2$ of glass/minute.

Consideration has been given to the possibility of increasing air flow to improve performance of the sheet of glass under considerations previously discussed. The technique has limitations. To this end, regardless of the dimension of the sheets of glass undergoing tempering, it is necessary to evacuate the air without altering or otherwise disturbing the blowing. As the air flow is increased, the requirement to evacuate the air increases, as does the likelihood that the air flow will be disturbed. Actually, in typical present-day installations about 60% of the total surface is taken up by the rolls of rollers which support the sheet of glass, the nozzles from which the air flow emanates and the equipment in general. In addition, about 5% of the total surface is occupied by incident blowing air. Thus, about 35% of the total surface is free surface for evacuation of air together with the calories or heat that is picked up from the sheet of glass. As may be appreciated, an increase in the volume of the air flow would require an increase in the size of the nozzles from which the air flow emanates. In addition, an increase in the volume of air flow would increase the total surface area occupied by incident air impinging on the glass sheet.

A surface area of about 35% of the total surface area is considered to constitute the lower limit for adequate evacuation of air, without alterations or otherwise disturbance of the blowing characteristics which will produce an inefficiency in cooling. Thus, an increase in the volume of the air flow would reduce the percentage below the lower limit.

An attempt to increase performance of the sheet of glass under impact has also centered about efforts to vary the air jets both in space and time. These variations include pulsation of jets and oscillation of the blowing devices. Also, it has been a consideration to overdensify the blowing in certain zones (alternating strong and weak tempering strips). While, essentially, it has been possible to obtain glasses without needles, that is, glasses without fragments longer than 7.5 cm with a higher degree of certainty, the result is only achieved at the cost of major complication of the apparatus which is used.

It is known that the heat exchange between air and the sheet of glass to be cooled is approximately proportional to the speed of movement of the flow of air. Therefore, in an effort to increase performance consideration has been given to increasing the feed pressure of the nozzles from which the flow of air emanates, thereby to reach greater air speeds. Feed pressures have been used to attain sonic, even supersonic speeds. This technique has made it possible to improve performance, albeit only slightly, and the improvement in performance has been realized in the tempering of sheets of glass of a thickness of 2.5 mm. However, the improvement in performance, once again, is realized only at the price of considerable cost in the expenditure of energy. What should be noted, however, is that improvement in performance has not always been realized in the tempering of sheets of glass of a thickness in the order of 2 mm, and the technique often results in a failure to satisfactorily meet regulations for use of the sheet of glass in automotive manufacture. And, it should be pointed out that the technique is not carried out under conditions that are economically satisfactory or compatible with industrial production using sheets of glass having a thickness of less than 3 mm.

SUMMARY OF THE INVENTION

The invention is directed to apparatus, and a process technique to remedy the problems and disadvantages of the prior art. According to the invention, sheets of glass having a thickness of about 2 mm and less may be tempered to meet regulations, such as the regulation heretofore discussed, with a production cost that is compatible with industrial production. The invention, also, is directed to the tempering of sheets of glass having a thickness greater than about 2 mm under economic conditions that are more favorable than those under which that thickness of sheet of glass is produced (tempered) today.

According to the invention, a plurality of nozzles from which a flow of gas emanates are located so that their free ends are directed toward the confined sheet of glass and in a position slightly spaced from the surface of the sheet. Each nozzle is pierced by a narrow, calibrated orifice and the feed pressure of each nozzle is maintained for purposes of blowing the gas, generally air, at least at sonic speed toward the surface of the confined sheet.

The narrow calibrated orifice shaped in each nozzle exhibits a pressure loss at the free end where the shock wave or optionally multiple shock waves which are produced are applied. It is guaranteed that speed of the air, moving at least at sonic speed, is actually obtained at the surface of the sheet of glass, and the energy expended to feed the nozzles is not unnecessarily dissipated by poorly placed pressure losses or interactions between multiple shock waves. Thus, there is an optimization of the cooling power.

The invention proposes to increase the possibilities of the evacuation of the blown air. One measure in increasing the evacuation of blown air resides in the replacement of standard rollers of a roller conveyor for supporting the sheet of glass by rollers of smaller size and/or by using nozzles having longer tubular bodies extending toward the free end. These nozzles may be longer in relation to the width of the tempering station. In addition or as a further alternative, the flow of blown air may be increased in volume per unit of surface.

As will be described in greater detail as the description continues, the invention makes possible the tempering of sheets of glass having a thickness of about 2 mm or less, as well as sheets of glass having a thickness of greater than 2 mm under economically advantageous conditions. The tempered sheet of glass, according to the practice of the invention, has been found to meet criteria set out in motor vehicle regulations.

BEST MODE FOR CARRYING OUT THE INVENTION

Figure 1:
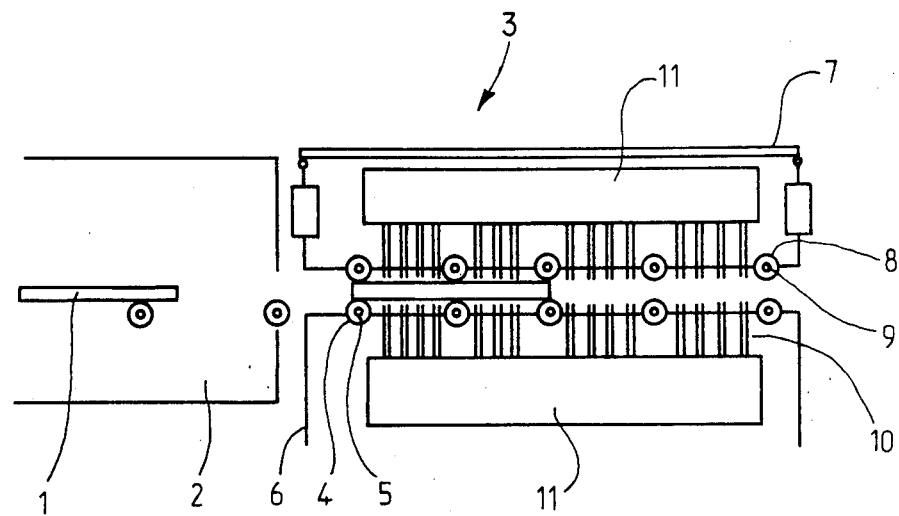
FIG. 1 is a diagrammatic view, in elevation, of a tempering apparatus.

Referring to FIG. 1, a flat tempering installation for sheets of glass is shown (diagrammatically). Particularly, the installation includes a conveyor of conventional construction for conveying a sheet of glass 1 (hereafter "sheet") to a tempering station 3. The sheet is delivered to the entry of the tempering station at an elevated temperature on the order of about 650° C. An installation 2, such as a glass heating furnace or float furnace may be used to heat the sheet to be tempered within the tempering station.

A conveyor characterized by a first series of rollers 4 a second series of rollers 8 provide a holding support for the sheet. The series of rollers 4 also provide a driving impetus for movement of the sheet in a downstream direction from the entry end of the tempering station. Each roller 4 is mounted on a shaft 5, and each roller 8 is mounted on a shaft 9. The shafts 5 are carried by a frame 6, and the shafts 9 are carried by a frame 7. As seen in FIG. 1, the shafts 5, 9 and rollers 4, 8 are disposed, respectively, above and below sheet 1 in a mirror image disposition. Thus, frame 6 may be considered a lower frame, and frame 7 may be considered an upper frame.

The rollers 4 provide a driving impetus, as well as a support for the sheet 1. To this end, the shafts 5 and the rollers 4 mounted for movement with the mounting shaft are driven in rotation, or a single shaft may be driven and, in turn, drive the other rollers and their idler shafts, as desired. The drive means which is not shown may be considered conventional.

Upper frame 7 is adjustable relative to the lower frame 6. In operation, the upper frame is adjusted relative to the lower frame, thereby to provide a space between the rollers 4, 8 sufficient for passage of sheet 1. The rollers 8, each of which may be freely movable about its supporting shaft, serve as holding supports in maintaining the position of the sheet on rollers 4.

A plurality of blowing nozzles 10 (hereafter "nozzles") are located between the shafts 5, 9 and between the rollers 4, 8, in positions both along the length and across the width of the tempering station. The nozzles extend in a substantial vertical orientation from the frames 6, 7 toward the path along which a sheet 1 is conveyed from the entry end of the tempering station.

Each nozzle 10 is connected to a box 11. The boxes are maintained under pressure and serve as a source of gas which is discharged through the nozzles toward the sheet 1.

Figure 2:
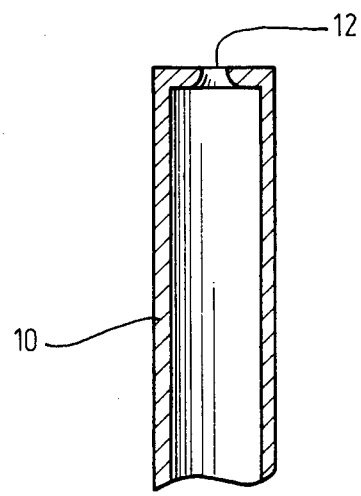
FIG. 2 is a diagrammatic view, in section, of a flowing nozzle.

A nozzle 10 of the type advantageously used in the tempering station may be seen in FIG. 2. As illustrated, the nozzle comprises a cylindrical body including an orifice 12 at the end adjacent the path of movement of the sheet 1. The orifice of the nozzle is a narrow, calibrated opening of a diameter of 1.5 mm, for example. The internal surface of the edge around the opening is bevelled so that the reduction factor is close to 1. The body of the nozzle may be 4 to 6 mm in diameter. The length of the body is at least eight times the dimension of the diameter, and preferably about ten to twenty five times that of the diameter.

From the above discussion, it will be appreciated that the length of the body of each nozzle 10 may vary while maintaining sufficient length to stabilize the flow of air. Thus, the length of the body will determine the positioning of each box 11 providing a source of air, so that the evacuation of air following impact on the surface of the sheet 1 and movement between the nozzles will not be unduly impeded. The length of the nozzle is directly related to the factor of the boxes 11 becoming an obstacle to the evacuation of air. The length of nozzle is also directly related to the size of the tempering station, particularly the size as determined by the width for tempering large sheets of glass, and/or the flow of air as blown through the orifice.

The end of each nozzle 10 is preferably located at a distance from the path of movement of a sheet 1 through tempering station 3 on the order of about six times the diameter of orifice 12. This spacing has been found to maintain a considerable air impact speed on the surface of a sheet 1 that differs as little as possible and only slightly from the speed of the air at the orifice. The distance between the orifice of each nozzle and the sheet, including the nozzles located both above and below the sheet, will be about 5 to 15 mm. Preferably, the distance will be about 5 to 8 mm.

The description to this point has been directed to a nozzle 10 of tubular outline having an orifice 12 in the form of a circular bore into the interior of the body. It is considered that at least certain nozzles in the arrangement previously discussed may be in the form of slit nozzles with the outlet orifice being characterized by a narrow, calibrated slit. As previously discussed and for the same purpose, the orifice will include bevelled edges leading to the interior of the body. The dimensional characteristics of the slit nozzles is such that the maximum pressure loss encountered by the air in the path is at the narrow end. In carrying out the invention, portions of rows of nozzles or even entire rows of nozzles of tubular outline crosswise of the tempering station may be replaced by slit nozzles.

The dimensional characteristics, such as the width of the body of a slit nozzle, the relation between the length of the nozzle and the width, the width of the orifice and the distance relative to the path of movement of a sheet 1 will be the same as those of tubular nozzles. To this end, the nozzle body will have a width of about 4 to 6 mm, a height of at least about eight times the dimension of the width (preferably about ten to twenty five times the dimension), a slit width of about 1.5 mm, and a positioning of the orifice of the slit nozzle relative to the path of a sheet 1 not to exceed six times the width of the air jet at its output.

The use of tubular and slit nozzles have their advantages and disadvantages. To this end, a slit nozzle may supply a slightly greater amount of tempering air which can be advantageous, particularly at the entry end of the tempering station 3. However, the slit nozzle may not provide the same measure of enhancement throughout the tempering station since the enhancing feature may be counterbalanced because of the fact that the possibilities of the evacuation of air from slit nozzles is not as good as that obtained with tubular nozzles.

A relative pressure at least equal to 0.9 bars will provide a sonic air ejection speed with the tubular nozzles 10, or optionally, the slit nozzles. An output of air from these nozzles at supersonic air ejection speed may be possible by feeding the nozzles under higher pressures. It is considered, however, that the relative feed pressure of nozzles 10 by boxes 11 should provide a sonic air ejection speed and, thus, be limited to a feed pressure of about 1 bar. In this manner, not only will high energy expenditures be avoided, it will also be possible to prevent formation of multiple waves which otherwise would interact.

Figure 3A:
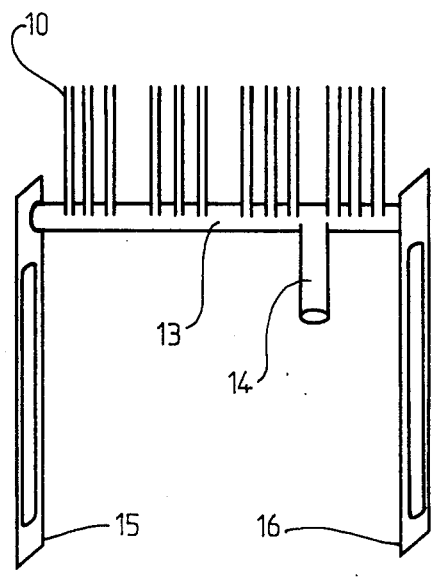
FIGS. 3A, 3B, 3C and 3D illustrate various series of grouped nozzles.
Figure 3B:
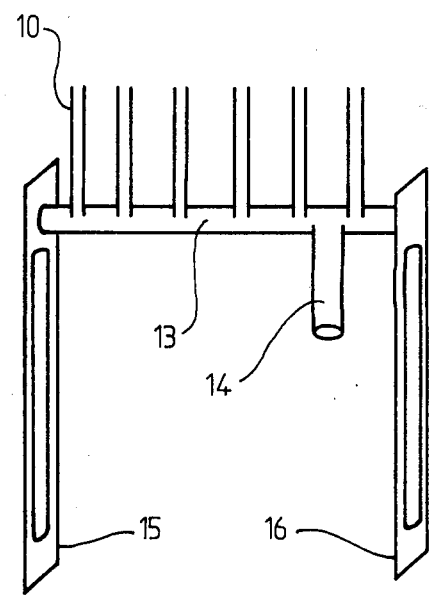
Figure 3C:
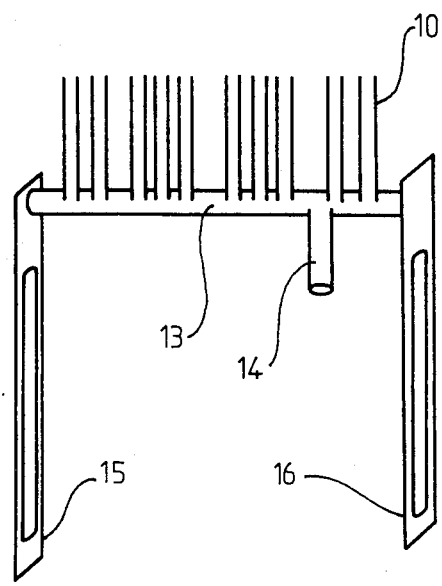
Figure 3D:
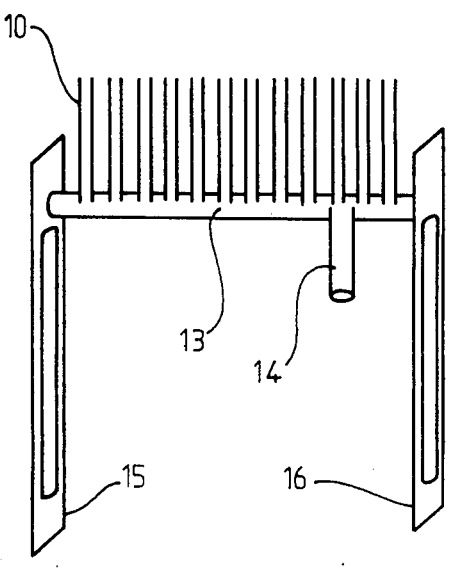

The nozzles 10 may be assembled in set spacing in an array along and across tempering station 3 as illustrated in FIGS. 3A, 3B, 3C and 3D. The array calls for nozzles to be located between the shafts 5, 9 and between the rollers 4, 8. For example, FIGS. 3A and 3C illustrate the spacing or pitch between each nozzle of a series of nozzles, with the spacing of the nozzles in FIG. 3C being slightly more dense. FIGS. 3B and 3D illustrate an arrangement like that of FIGS. 3A and 3C with the pitch or spacing having a generally regular series pattern.

A pipe 13 serves as a manifold for connection of a series of nozzles 10 crosswise of tempering station 3. Pipe 13 may be of a diameter of about 27 mm, with an internal diameter of about 20 mm. A pipe 14 is connected to pipe 13.

Referring to FIGS. 3, pipe 14 is connected at a surface location opposite the location of connection of a nozzle. The pipes, however, may also be connected axially, as choice dictates. A hose (not shown) connects each pipe 14 to a respective box 11.

The individual series of nozzles 10, pipe 13 and pipe 14, in each of FIGS. 3, are supported for sliding movement in a vertical direction thereby to locate the orifice 12, or slit opening, in the several nozzles at a position closer to or further away from the path of movement of sheet 1. As illustrated in these Figures, a pair of bars 15, 16 support opposite ends of pipe 13. The bars 15, 16 comprise a part of the frames 6, 7, and each bar is grooved or otherwise provided with structure to allow movement of an entire series of nozzles relative to the bars.

The spacing or pitch between nozzles within the tempering station 3, in both the crosswise and lengthwise direction, is as regular as possible. However, it is recognized that both rollers 4, 8 and shafts 5, 9 must be accommodated thereby to only slightly vary the otherwise regular pattern. The pitch or spacing of tubular nozzles crosswise of the tempering station generally is not less than three times the diameter of the jet of air at the orifice 12. The pitch or spacing between tubular nozzles lengthwise of the tempering station, also, is generally not less than three times the diameter of the jet of air at the orifice. By placement of tubular nozzles in varying arrays within the tempering station, both above and below the path of movement of a sheet 1, it is possible to construct a great variety of tempering stations exhibiting different configurations with regard to the positioning of the nozzles.

Thus, the array of nozzles may provide a greater density of nozzles at an entry end of the tempering station. This type of an array may be particularly attractive for tempering very thin sheets. Therefore, an arrangement of nozzles with a slight pitch, both crosswise and lengthwise of the tempering station, may be used to create a temperature difference between the core and skin of the sheet. The temperature difference between the core and skin of the sheet, once attained, may be maintained even if the density is decreased somewhat. Thus, it is possible to increase blowing to the detriment of the ability to evacuate air over a short length of the tempering station; provided, however, that the area for evacuation of air is increased at least to the minimum percentage after the zone of greater density of nozzles. As previously indicated, it may be advantageous in various of the configurations of arrays to elongate the nozzles so as not to obstruct the possibilities of escape of air.

It is also possible through an arrangement of nozzles to obtain a very intense, sudden cooling at the entry end of the tempering station. To this end, all or at least a part of the tubular nozzles in the first several crosswise rows of nozzles may be replaced with slit nozzles of the type having a narrow free end. However, having presented a handicap for the escape of air to be evacuated from the tempering station within the region of the entry end, during a period of time on the order of about 0.2 to 0.5 sec., it is necessary to provide downstream compensation for the reduced ability or inability to satisfactorily evacuate air. Particularly, blowing means in the form of long tubular nozzles that promote the evacuation of air are disposed downstream of the slit nozzles.

The conditions for placing the slit nozzles are the same as those for placing the tubular nozzles. To this end, the widths of the slits of the slit nozzles are identical to the diameter of the orifices of the tubular nozzles. Further, the distance between the slit and the surface of a sheet, the spacing of the nozzles in an array of nozzles, and so forth are the same.

It may be advantageous not only to place a row or a vertical row or rows of slit nozzles at the entry end of the tempering station and incline the slit nozzles in a downstream direction. The slit will be in the form of a narrow, calibrated opening which is more narrow than the body of the nozzle itself. In this manner, the maximum pressure loss in the air path is at the end of the nozzle so that it may be fed with air under pressure in the same manner as a tubular nozzle to provide an air jet at a sonic ejection speed.

Tempering stations with differing arrays of nozzles have been constructed to temper a glass sheet of a thickness of 1.6 mm. The arrays include the series of nozzles of FIGS. 3A, 3B, 3C and 3D. The tempering stations are illustrated diagrammatically in FIGS. 4A, 4B, 4C and 4D.

In each of the tempering stations, the shafts 5, 9 have a diameter of about 17 mm, the rollers 4, 8 have a diameter of about 60 mm, and the rollers on contiguous shafts are staggered. Referring to FIG. 3A, the nozzles are spaced at intervals (expressed in millimeters) of 11, 11, 23, 11, 11, 23 . . . The larger intervals are provided to accommodate a roller 4 or 8. In the series of FIG. 3B, the nozzles are spaced at regular intervals of 22.5 mm. In the series of FIG. 3C, the nozzles are spaced at intervals of 19.5, 22, 11.5, 11.5, 22, 11.5 . . . In the series of FIG. 3D, the nozzles are spaced at intervals of 11.25, 11, 11.25, 11 . . .

Figure 4A:
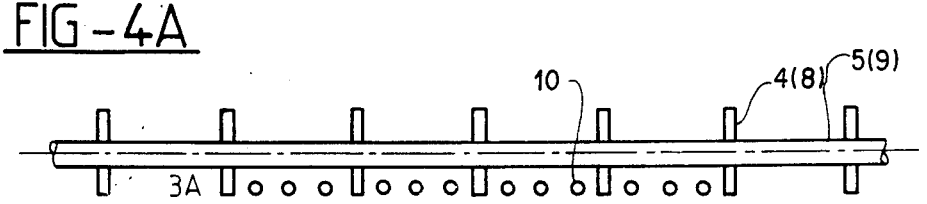
FIGS. 4A, 4B, 4C and 4D illustrate various configurations of a tempering station in the tempering apparatus.

Referring to FIG. 4A, the Figure is a diagrammatic representation of an array of nozzles including nozzles of the series of FIGS. 3A, 3B and 3C located between a pair of contiguous shafts 5 or 9, spaced apart by a distance of 90 mm. Thus, the array of nozzles may be a first series of nozzles (Series 3A) which extend towards the path of movement of a sheet 1 from either the lower or upper frame 6, 7, respectively. The shafts 5, 9 are placed one after the other lengthwise of the tempering station, and the rollers 4 or 8 carried by one shaft 5 or 9, respectively, are located between rollers on the contiguous shafts.

In FIG. 4A, a series of nozzles is spaced at a distance of 15 mm from the shaft 5 or 9 (hereafter "shaft"), a second series of nozzles (series 3B) is spaced at a distance of 45 mm from the shaft and a third series (series 3C) of nozzles is spaced at a distance of 75 mm from the shaft. The distance between the third series of nozzles and the next contiguous shaft is 15 mm. The same sequence of series, that is, the series of FIGS. 3A, 3B and 3C begins again in the space between that shaft and the next contiguous shaft. The tempering station of FIG. 4A comprises about nineteen nozzles per area of one square decimeter 19/dm², of surface and per face. A single nozzle effects about 5 cm² of sheet surface.

Figure 4B:
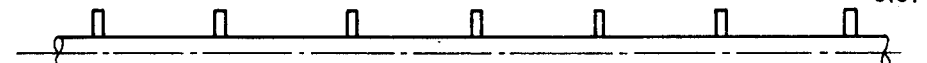

The tempering station of FIG. 4B is represented diagrammatically by a pair of contiguous shafts 5 or 9, spaced apart by a distance of 120 mm. This tempering station, likewise, includes the series of FIGS. 3A, 3B and 3C. In this array of nozzles the first and third series (series 3A and 3C) are spaced from a shaft by a distance of 20 mm, and these series are spaced from the second series (series 3B) by a distance of 40 mm.

The tempering station of FIG. 4B includes about fifteen nozzles per dm² of surface and per face. A single nozzle effects about 6.5 cm² of sheet surface.

Figure 4C:
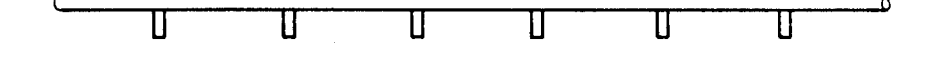

The tempering station of FIG. 4C is likewise represented diagrammatically by a pair of contiguous shafts 5 or 9. These shafts are also spaced apart by a distance of about 120 mm. The array of nozzles includes the series of FIGS. 3A, 3B, 3C and 3D, with the first series (series 3A) and fifth series (series 3C) spaced from a shaft by a distance of 12 mm. The second, third and fourth series (the series 3D, 3B and 3D) are separated from each other and the first and fifth series by a distance of 24 mm.

The tempering station of FIG. 4C includes about twenty seven or twenty eight nozzles per dm² of surface per face. A single nozzle affects about 3.5 cm² of sheet surface.

The tempering station of FIG. 4D, again, is represented diagrammatically by a pair of contiguous shafts 5 or 9. These shafts are spaced apart by a distance of about 120 mm. This array of nozzles, as the array of FIG. 4C, includes the series of FIGS. 3A, 3B, 3C and 3D. In all, the array includes a first through seventh series, each of which is spaced either from an adjacent series or a shaft by a distance of 15 mm.

The tempering station 4D includes about forty nozzles per dm² of surface per face. A single nozzle effects about 2.5 cm² of sheet surface.

In each tempering station the density of nozzles is considerable and in any event in excess of ten per dm². In these tempering stations the distance between rows of nozzles is not great and in any event less than 50 mm.

Varying thickness of a sheet 1 may be tempered with an array of nozzles 10, as well as a disposition of contiguous shafts 5 or 9, as illustrated in FIGS. 4A, 4B, 4C and 4D.

A sheet 1 having a thickness of 2.6 mm may be tempered in the tempering station of FIG. 4A. In the overall operation, the sheet will be heated to a temperature of 640°C. and moved through the tempering station at a speed of 10 cm/s. The length of the tempering station is 450 mm, the nozzles 10 are fed under a pressure allowing sonic speed of movement of air, and the sheet will be tempered in about 4.5 seconds. The stresses measured at the core are on the order of 730 kg/cm², and after breaking through impact, 366 fragments in a 5 cm×5 cm area were counted.

In the tempering station of FIG. 4A, the blowing surface, that is, the surface of all of the air jets, at the outlet of the nozzles, represents about 0.37% of the total surface area of the tempering station. The rollers, shafts and nozzles represent an additional 40% of the total surface area. Accordingly, about 60% of the total surface area of the tempering station remains for purposes of evacuation of air heated in contact with the sheet.

The tempering station provides for the tempering of sheets of 2.6 mm thickness with a volume of air less than would be considered necessary. Actually, the volume of air is on the order of 80 Nm³/m²/min on each face of the sheet. The volume of air may be reduced because of the effectiveness of the blowing which is a factor of the greater air speed, the capability of evacuation of air and the regular pitch between nozzles.

The tempering station of FIG. 4B has a length in excess of 450 mm, a space of about 120 mm between contiguous shafts (either the shafts 5 or 9) and a pitch between rows of nozzles of about 40 mm. Each outside row of nozzles, however, is spaced from an adjacent shaft by a distance of 20 mm. A sheet 1 having a thickness of 2.9 mm may be tempered during movement through the tempering station at a speed of 10 cm/s.

Figure 4D:
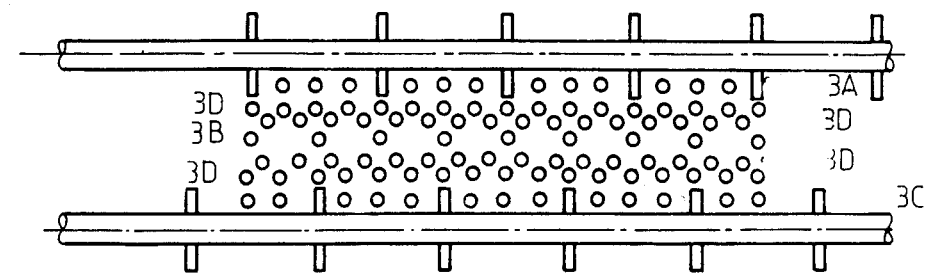

The tempering stations of FIGS. 4C and 4D are suitable for tempering sheets having a thickness less than the sheets heretofore described. The illustration demonstrates the increase in density of the nozzles throughout the tempering station.

As previously discussed, the density of nozzles downstream of the entry end of the tempering station may be reduced, yet maintain the temperature of the sheet. In this connection, the density of nozzles in an array, such as that of FIGS. 4C and 4D may be maintained throughout a distance of about 30 cm or more. Thereafter, throughout the remainder of the tempering station the density of nozzles may be reduced.

Considering a sheet 1 having a thickness of 2.1 mm, the array of nozzles throughout the first 240 mm of length from the entry end may be of the type of FIG. 4C. Over the next 360 mm of length the array of nozzles may be of the type of FIG. 4B. Thereafter, every standard slit nozzle, fed with air at lower pressure (about 485 mm column of water), maintains cooling. The slit nozzles are located at every 120 mm spacing. The sheet 1 may be moved through the tempering station at a speed of 30 cm/s.

A sheet 1 having a thickness of 2 mm may be tempered in a tempering station having an array of nozzles now to be described. Since the sheet is somewhat thinner the density of nozzles may be increased thereby to provide an array of nozzles of FIG. 4C throughout about 360 mm from the entry end of the tempering station. The next 240 mm will be provided with an array of nozzles of FIG. 4B, followed by an array of nozzles providing a low pressure blowing. The sheet to be tempered is heated to a temperature of about 650° C. and moved at a speed of between 5 and 30 cm/s through the tempering station. A preferred speed may be about 10 cm/s.

The sheet 1 moves between upper and lower arrays of nozzles, each of which delivers air at sonic speed. The tips of the nozzles are spaced at a distance of about 5 mm from the surface of the sheet. The stresses measured at the core are on the order of 740 kg/cm$^2$, and after breaking through impact, 322 fragments in a 50 mm$\times$50 mm area were counted. The percentage of the total surface area taken by the rollers, shafts and nozzles remains on the order of 40%, actually about 39%. The surface of all of the air jets, at the outlet of the nozzles, that is, the blowing surface, represents about 0.50%, thereby to provide about 60% of the total surface area of the tempering station for the function of evacuation of blown air.

A sheet 1 having a thickness of less than 2 mm may be tempered in the tempering station. In carrying out the tempering operation a density of nozzles, such as that of FIG. 4D wherein the density is on the order of forty nozzles per dm$^2$ may be used. In this operation, the nozzles are located at a distance of about 5 mm from surface of the sheet. A sheet having a thickness of 1.6 mm, travelling at a speed of movement on the order of 20 cm/s, may be tempered by an array of nozzles of FIG. 4D located throughout a length of about 120 cm from the entry of the tempering station. The remaining length of the tempering station is provided with slit nozzles fed with low pressure air (a pressure of about 485 mm column of water). The slit nozzles shaped to operate at sonic speed provide a considerable blowing density. As previously stated, it is possible to utilize slit nozzles at the entry end of the tempering station, with the slit nozzles comprising all or a part of each crosswise row of nozzles. While the slit nozzles may be used in replacement for tubular nozzles, either at the entry end of the tempering station or at downstream locations, their positioning relative to the surface of a sheet, as well as their spacing in a downstream direction, and so forth, is the same as the consideration of positioning, spacing, and so forth for tubular nozzles.

The air flow for either type of nozzle will be less than 150 Nm$^3$/M$^2$/min per face for the air ejected at sonic speed. Further, the time during which tempering is carried out will be less than 10 seconds. The speed of movement of a sheet through the tempering station will be between 5 cm/s and 30 cm/s. The surface area for escape of air will be greater than 50%, irrespective of whether slit nozzles having a greater efficiency of blowing are used. And, the energy expenditure has been found to be about 2.5 to 3 times less than the energy expenditure of tempering apparatus of the prior art.

It has been found that the speed of movement of a sheet 1, under nozzles 10, should be greater than P/t$^2$, and closer to 2P/t$^2$ which is the preferred speed. In the relationships, P is the pitch or spacing between rows of nozzles, and t is the thickness of the sheet.

The nozzles 10 of the invention effect a surface area of sheet 1 on the order of about 2 to 7 cm$^2$, and the number of nozzles in an array is in excess of ten. Preferably, the array will include fifteen to forty nozzles per dm$^2$ on each surface of the sheet. In the prior art the total number of nozzles is smaller, and each nozzle covers a considerable surface area of sheet, for example, about 30 cm$^2$.

Several features of the invention, as previously discussed, provide better performance in the tempering of a sheet of glass and, additionally, render it possible to temper a sheet of a thickness of about 2 mm or less. These features also render it possible to temper a sheet having a thickness of 3 mm, 4 mm or more with greater ease than heretofore experienced following conventional glass tempering techniques. These features include, the reduced volume of air at higher speed which enhances cooling efficiency, the proximity of the tips of the several nozzles relative to the surface of the sheet, the shape of each nozzle orifice which assures that the gas will emanate out of an orifice at sonic speed, the size of the blowing instrumentality, and the major extent of the surface area within the tempering station reserved for the evacuation of blown gas, which may be air, after it strikes the surface of the sheet. The reserved space will be in excess of 50% of the total surface, and generally on the order of 60%.

Since the flow of blown air is smaller than the flow of blown air in prior art tempering stations, the reserved space for the escape of air may be greater. The larger the reserved space less is the problem of an interaction between incident jets of blown air, and the "used" air to be evacuated is less. In the prior art, because of the interaction between incident jets of blown air, it oftentimes was not possible to obtain maximum efficiency of the incident jets, and the difficulty of air evacuation became greater the greater the glass sheets to be tempered.

The apparatus of the invention is simpler in operation than apparatus of the prior art. The apparatus of the invention provides for a flow of air that is distributed equally and automatically over the entire tempering station. Thus, if it is desired to reduce the surface of the tempering station, for example, to reduce the width of the tempering station thereby to operate on sheets having a similarly reduced width, it is possible to plug nozzles that are not used and at the same time maintain the distribution of flow and pressure in the nozzles which remain in service. This may be carried out as an energy saving measure. Because of the adiabatic expansion that occurs at the outlet of a nozzle 10, the air is colder than air simply ventilated. Therefore, the cooling power of the air is higher.

In the operation of tempering sheets of glass having a thickness of 2 mm or less, it is appropriate to arrange the tempering station with an array of nozzles at constant spacing in the direction of advance of the sheet. Each nozzle will be fed with a pressure providing an air flow at sonic speed. Sheets of glass of greater thickness, on the order of 4 mm, may be tempered in the same general manner and by a similar arrangement of nozzles. The nozzles, however, are fed with air at low pressure.

While the discussion to this point has been directed to the technique of glass (horizontal) tempering, it should be apparent that the solutions specified for flat tempering, in feeding air under a pressure allowing some ejection speeds, and the use of nozzles shaped to exhibit the maximum pressure loss encountered by the air in its path at the free end, may be applied to vertical tempering, as well.

What is claimed is:

1. A process for tempering a sheet of glass of substantially 2 mm thickness while located in substantially a horizontal attitude within a tempering station, said process comprising providing a first array of nozzles above said sheet and a second array of nozzles below said sheet, each said array for distribution of air including a plurality of subarrays of nozzles each disposed at substantially regular spacing in each of a plurality of individual regions along said tempering station, disposing a subarray of nozzles of said first and second arrays in a density of nozzles of at least about ten nozzles per square decimeter of surface area of said sheet within at least a first region at the entry to said tempering station, disposing subarrays of nozzles of said first and second arrays within regions further along said tempering station in a density of nozzles no greater than said first-mentioned density, locating a narrow free end of each nozzle of each subarray of nozzles and a restricted outlet orifice therein toward said sheet and at a spacing closely adjacent a respective surface of said sheet, communicating a gas at a pressure of at least 0.9 bars from a source to said nozzles to exit said restricted outlet opening and impinge on surfaces of said sheet at sonic speed for cooling the same, and wherein said restricted outlets of said nozzles are shaped, and the gas pressure is controlled, such that the pressure loss encountered by said gas along the flow path to each said surface is at its maximum at the restricted outlet orifice of a nozzle and such that the shock wave resulting from said sonic flow of gas from said nozzles remains attached to said nozzles, so that said gas impinges on said glass at sonic velocity, and further wherein at least 50% of the space adjacent said path of movement of said sheet in said tempering station is free of obstruction for evacuation of cooling gas after impinging on said surfaces.

2. The process according to claim 1 wherein the ends of the nozzles are placed a slight distance from the glass less than six times the diameter of the gas jet at its output from the nozzles.

3. The process according to claim 1 wherein the nozzles of each array have a spacing one from another not less than 3 times the diameter of the gas jet at its output from the nozzles.

4. The process according to claim 1 including moving the sheet through said housing and between the arrays of nozzles at a speed of movement, measured in terms of centimeters per second, greater than $P/t^2$, wherein P is the spacing between the nozzles in the downstream direction of movement of the sheet and t is the thickness of the sheet.

5. The process according to claim 4 wherein the speed of movement of the sheet is about $2P/t^2$.

6. The process according to claim 4 wherein the speed of movement of the sheet is between 5 and 30 cm/s.

7. The process according to claim 1 wherein the nozzles of said first and second array of nozzles at the entry end of the tempering station, extending in a downstream direction are located in a density arrangement of nozzles greater than the density arrangement of nozzles within said tempering station although further downstream of said first-mentioned density arrangement so as to blow more gas from the entry end of the tempering station.

8. The process according to claim 1 wherein more than 50% of the free surface on each face of the glass is reserved for evacuation of the blown glass.

9. The process according to claim 1 wherein an array includes 15 to 40 tubular nozzles per square decimeter of each side of the glass.

10. The process according to claim 9 wherein at least some of the nozzles of said arrays at the entry end of the tempering station are slit nozzles having their free ends narrowed, said slit nozzles being fed with gas in the same way as the remaining nozzles of said arrays so that the glass moving at a speed of movement, measured in terms of centimeters per second, greater than $P/t^2$, wherein P is the spacing between nozzles in the downstream direction of advance of the sheet and t is the thickness of the sheet is subjected to blowing of said slit nozzles for a period of around 0.2 seconds and not more than 0.5 seconds.

11. The process according to claim 1 wherein the air flow per face is less than 150 $Nm^3/m^2/min$.

12. Application of the process according to claim 1 to tempering of glass not more than 2.6 mm thick to meet the requirements of regulations on motor vehicle glasses, characterized in that air on the order of 80 $Nm^3/m^2/min$ is blown on each face of the glass by a multiplicity of nozzles fed under a pressure of at least 0.91 bar, placed in rows spaced about 30 mm in the lengthwise direction of advance of the glass, over a length of about 45 cm, at a rate of 19 tubular nozzles per $dm^2$ of tempering station, said nozzles coming out at a distance from the glass on the order of 5 to 8 mm, and the glass passing at about 10 cm/s.

13. Application of the process according to claim 12 to tempering glass 2.1 mm thick to meet the requirements of regulations on motor vehicle glasses, wherein there are placed on each face of the glass about 27 tubular nozzles per $dm^2$ in spaced rows or 24 mm in the direction of advance of the glass, over about 24 cm in length, then about 15 tubular nozzles per $dm^2$ in spaced rows of 40 mm over about 36 mm in length, said nozzles coming out a distance from the glass on the order of 5 to 8 mm, the glass passing at about 10 cm/s, and the standard slit nozzles fed under a pressure of about 485 mm of a water column then being provided.

14. Application of the process according to claim 12 to tempering glass 2 mm thick to meet the requirements of regulations on motor vehicles, wherein there are provided on each face of the glass about 27 tubular nozzles per $dm^2$ in spaced rows of 24 mm over about 36 cm, then about 15 tubular nozzles per $dm^2$ in rows spaced 40 mm over about 24 cm, said nozzles coming out 5 mm from the glass, the glass passing at 10 cm/s and standard slit nozzles fed under 485 mm column of water then being provided.

15. Application of the process according to claim 12 to tempering of glass with a thickness less than 2 mm to meet the requirements of regulations on motor vehicle glasses, wherein there are placed on each face of the glass about 40 tubular nozzles per $dm^2$ in rows spaced 15 mm over 120 cm of length, said nozzles coming out 5 mm from the glass, the glass passing at 20 cm/s and standard slit nozzles fed under 485 mm column of water then being provided.

16. Application according to claim 12, wherein all or part of the tubular nozzles of the first crosswise rows of the tempering station, over such a distance that the glass is subjected thereto only a maximum of 0.5 seconds, are replaced by narrowed slit nozzles fed spaced and placed like the tubular nozzles they replace.

* * * * *